(12) United States Patent
Ahmed et al.

(10) Patent No.: US 11,418,108 B2
(45) Date of Patent: Aug. 16, 2022

(54) OUTPUT VOLTAGE PROTECTION FROM PRIMARY SIDE WHILE INITIATING SECONDARY SIDE CONTROLLER OF AC-DC CONVERTER

(71) Applicant: Cypress Semiconductor Corporation, San Jose, CA (US)

(72) Inventors: Rashed Ahmed, Fremont, CA (US); Murtuza Lilamwala, San Jose, CA (US)

(73) Assignee: Cypress Semiconductor Corporation, San Jose, CA (US)

(*) Notice: Subject to any disclaimer, the term of this patent is extended or adjusted under 35 U.S.C. 154(b) by 53 days.

(21) Appl. No.: 17/126,814

(22) Filed: Dec. 18, 2020

(65) Prior Publication Data

US 2022/0200438 A1  Jun. 23, 2022

(51) Int. Cl.
*H02M 1/00* (2006.01)
*H02M 1/32* (2007.01)
*H02J 7/06* (2006.01)
*H02M 7/21* (2006.01)
*H02M 1/36* (2007.01)
*H02M 1/08* (2006.01)

(52) U.S. Cl.
CPC ............ *H02M 1/32* (2013.01); *H02J 7/06* (2013.01); *H02M 1/08* (2013.01); *H02M 1/36* (2013.01); *H02M 7/21* (2013.01); *H02J 2207/20* (2020.01); *H02J 2207/30* (2020.01)

(58) Field of Classification Search
CPC ............ H02M 1/32; H02M 1/08; H02M 1/36; H02M 7/21; H02J 7/06
See application file for complete search history.

(56) References Cited

U.S. PATENT DOCUMENTS

| 9,948,196 B2 * | 4/2018 | Kikuchi ............ H02M 3/33523 |
| 10,944,330 B1 * | 3/2021 | Lee .................... H02M 3/33576 |
| 2021/0058000 A1 * | 2/2021 | Ahmed ..................... H02J 7/00 |

* cited by examiner

*Primary Examiner* — Adolf D Berhane
*Assistant Examiner* — Afework S Demisse
(74) *Attorney, Agent, or Firm* — Lowenstein Sandler LLP (57) ABSTRACT

A system includes a transformer having a primary winding and an auxiliary winding at a primary side of an AC-DC converter, the auxiliary winding reflecting an output voltage of a secondary winding of the transformer. A primary side controller includes an over-voltage protection (OVP) pin and an OVP circuit. A voltage divider includes a first resistor coupled between the auxiliary winding and the OVP pin and a second resistor coupled between the first resistor and a ground. The voltage divider provides, to OVP pin, a reduced voltage that is proportional to the output voltage. In absence of a pulse signal from a secondary side controller, the OVP circuit turns off a gate driver that drives a primary switch in response to the OVP voltage exceeding a reference OVP voltage. The primary switch is coupled between the primary winding of the transformer and the ground.

20 Claims, 7 Drawing Sheets

OUTPUT VOLTAGE PROTECTION FROM PRIMARY SIDE WHILE INITIATING SECONDARY SIDE CONTROLLER OF AC-DC CONVERTER

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. Alternating current to direct current (AC-DC) converters convert power from an alternating current (AC) source to a direct current (DC) at a specified voltage level. These AC-DC converters can be adapted to include USB-PD control that enables manufacturers to build a reliable, efficient, and cost-effective power adapter for a growing USB type-C charger market.

BRIEF DESCRIPTION OF THE DRAWINGS

The disclosure is illustrated by way of example, and not of limitation, in the figures of the accompanying drawings.

DETAILED DESCRIPTION

The following description sets forth numerous specific details such as examples of specific systems, components, methods, and so forth, in order to provide a good understanding of various embodiments of the techniques described herein for an over-voltage protection (OVP) system in an alternating current (AC) to direct current (DC) (or AC-DC) converter using an OVP circuit of a primary side controller while initiating a secondary side controller. It will be apparent to one skilled in the art, however, that at least some embodiments can be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations can vary from these exemplary details and still be contemplated to be within the scope of the present disclosure.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the disclosure. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which can also be referred to herein as "examples," are described in enough detail to enable those skilled in the art to practice the embodiments of the claimed subject matter described herein. The embodiments can be combined, other embodiments can be utilized, or structural, logical, and electrical changes can be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for output voltage protection from the primary side while initiating a secondary side controller of an AC-DC converter. For example, the AC-DC converter can include a transformer to step down an input AC voltage from a primary side into an output DC voltage on a secondary side of the AC-DC converter. The output DC voltage can be supplied to a USB Type-C connector for use in charging USB compatible devices, for example.

During startup of the AC-DC converter, however, an intermediate output voltage (referred to herein as "output voltage" for simplicity) of a secondary winding of the secondary side of the transformer is not regulated until the secondary side controller powers up and begins regulating the output voltage by sending pulse-width modulated (PWM) pulse (e.g., control) signals to the primary side controller. This unregulated output voltage during startup can cause the output voltage of the transformer to exceed manufacturer ratings of components on the output, which includes those of the secondary side controller. Other devices that include AC-DC topologies, such as full-bridge converter, half-bridge converter, forward converter, and the like are to be considered within the meaning of the term AC-DC converter as used herein.

In some embodiments, the transformer can include an auxiliary winding that generates a reflected voltage to the primary side in order to supply voltage to the primary side after startup of the AC-DC converter. In some embodiments, the auxiliary winding also reflects the scaled output voltage of the secondary winding of the transformer to the primary side, e.g., by being designed similar to the secondary winding but being positioned on the primary side.

To resolve the above-discussed deficiencies in the disclosed AC-DC converter, the present disclosure employs an over-protection (OVP) system and corresponding OVP logic to regulate the output voltage during startup. In some embodiments, the OVP system includes a primary side controller, which in turn includes an OVP pin and an OVP circuit. The OVP pin can be coupled between the auxiliary winding and the OVP circuit. In some embodiments, the OVP system can include a voltage divider (e.g., a pair of resistors) that is coupled between the OVP pin and the auxiliary winding in order to provide a reduced voltage, which is proportional to the output voltage, to the OVP pin of the primary side controller.

In some embodiments, the OVP circuit compares the reduce voltage to a reference OVP voltage, e.g., a threshold OVP voltage. For example, to perform such a comparison, the OVP circuit can include a comparator that operates in an OVP detect mode during initial startup before receiving the pulse (or control) signals from the secondary side controller. Further, in the absence of a pulse (or control) signal from a secondary side controller (which indicates that the secondary side controller does not yet control the operation of the primary side of the AC-DC converter), the OVP circuit can turn off a gate driver that drives a primary switch (e.g., a field effect transistor (FET), a gallium nitride (GaN) switch, silicon carbide (SiC) switch, a bipolar junction transistor (BJT), and the like) in response to the reduced voltage exceeding a reference OVP voltage. The primary switch is coupled between the primary winding of the transformer and ground. The reference OVP voltage is programmable and thus can be changed based on manufacturer voltage tolerances and selected resistors of the voltage divider, for example. The OVP circuit can turn off the gate driver by disconnecting the gate voltage to the gate driver, e.g., via a switch, pulling to ground or other methods as will be discussed.

In this way, a combination of the voltage divider and the OVP circuit prevents the output voltage on the secondary side of the transformer from going over a particular threshold voltage during startup, protecting the secondary side electrical components from an over-voltage condition or fault. This particular threshold voltage can be, for example, proportional to the reference OVP voltage. The embodiments described herein can also be implemented in other types of power adapters, power converters, power delivery circuits, or the like.

Figure 1:
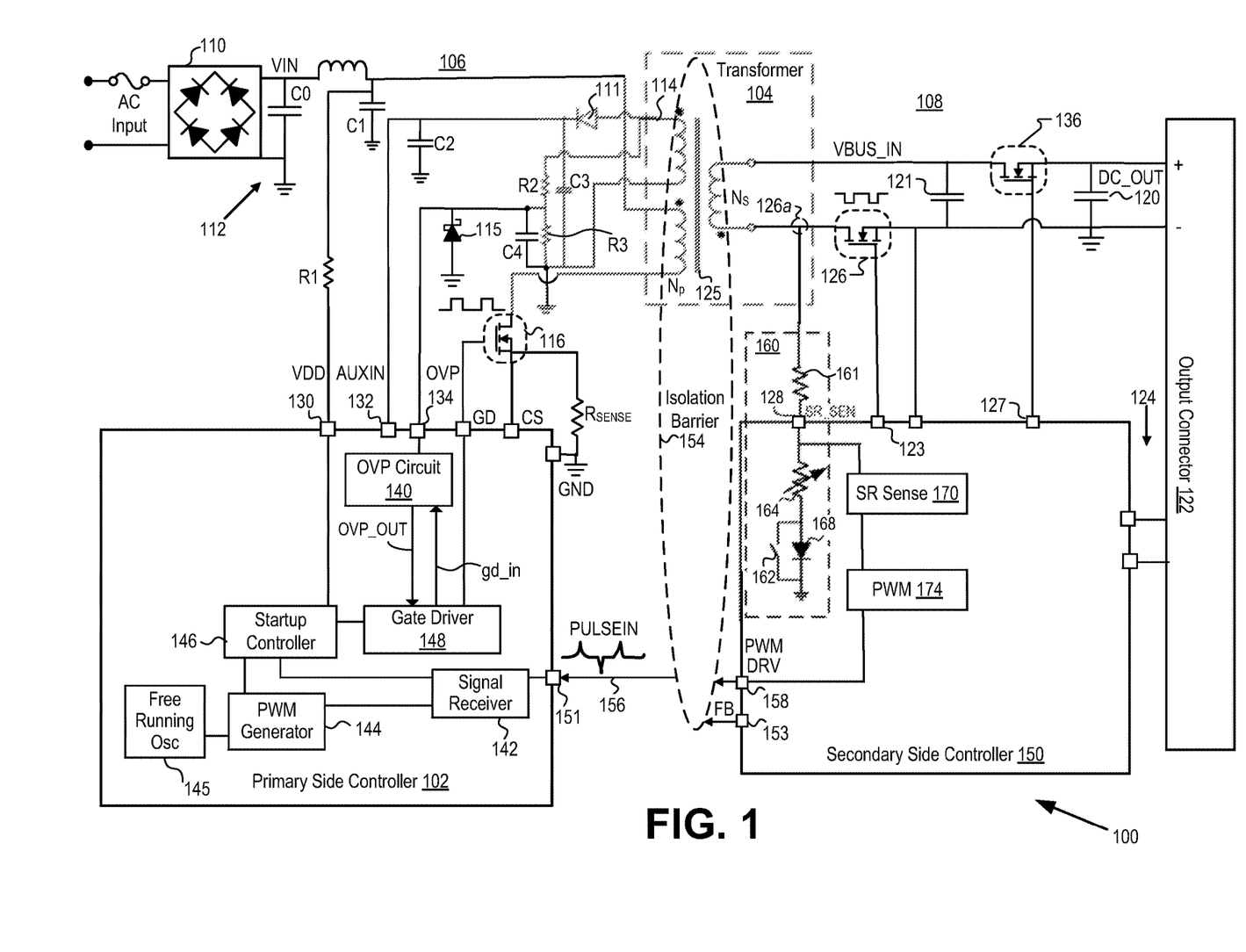
FIG. 1 is a schematic block diagram of an AC-DC converter in which a primary side controller includes an over-voltage protection (OVP) circuit to provide over-voltage protection to a secondary side while initiating a secondary side controller according to various embodiments.

FIG. 1 is a schematic block diagram of an AC-DC converter 100 in which a primary side controller 102 includes an over-voltage protection (OVP) circuit 140 to provide over-voltage protection to a secondary side while initiating a secondary side controller according to various embodiments. In various embodiments, the AC-DC converter 100 is an apparatus or part of an electronic device that includes charging capability, such as, for example, a laptop power supply, a power outlet with USB type-C connection, a multi-outlet power strip, a wall socket with USB type-C sockets, and the like.

In various embodiments, the AC-DC converter 100 includes a rectifier circuit 112 to receive an AC input from which to generate a rectified voltage, a DC output coupled with an output connector 122 (such as a USB type-C output connector), a transformer 104 coupled between the rectifier circuit 112 and the DC output, a primary side controller 102 coupled with the transformer 104, and a secondary side controller 150 coupled with the transformer 104 and coupled with the primary side controller 102 via a galvanic isolation barrier 154. The transformer 104 can include a primary winding (NP) on a primary side 106 electrically connected or coupled with the rectified input and a secondary winding (Ns) on a secondary side 108 coupled with the DC output. The transformer 104 can be adapted to step down the rectified voltage to a generate a reduced DC voltage.

In various embodiments, on the primary side 106, the rectifier circuit 112 includes a bridge rectifier 110 and one or more input filters coupled with a first terminal of the transformer 104 to rectify an AC input voltage and supply input power in the form of a rectified output to the primary winding of the transformer 104. In some embodiments, the input filters include, for example, capacitors C0 and C1, one or more diodes, and an RC filter (not all illustrated for simplicity). The AC input can be a set of universal AC main lines having an input voltage of 85 VAC to 265 VAC, for example.

In some embodiments, the AC-DC converter 100 further includes a power switch, such as a primary switch 116 having a first or drain node coupled with a second terminal of the transformer 104, a second or gate node coupled with the primary side controller 102, and a third or source node coupled with the primary side controller 102 and, through a current sensing element, such as a resistive element ($R_{SENSE}$) to ground to sense a primary side current flowing through the primary winding when the primary switch 116 is closed or conducting.

The primary side controller 102 can be implemented as an integrated circuit (IC) that is included as a component within the AC-DC converter 100. In various embodiments, the primary side controller 102 includes a start-up supply voltage pin 130, an supply voltage pin (AUXIN) pin 132, an over-voltage protection (OVP) pin 134, a gate driver (GD) pin, a current sense (CS) pin, and a ground (GND) pin. The primary side 106 can further include a resistive line (e.g., having one or more input resistor R1) coupled between the rectified output from the rectifier circuit 112 and the start-up supply voltage pin 130. This rectified output can be a supply voltage (VDD) of between 90V to 500V (e.g., 500V) or similarly higher voltage. The supply voltage can initially power the primary side controller 102 during startup.

In various embodiments, the AC-DC converter 100 further includes an isolation circuit or galvanic isolation barrier 154 to electrically isolate the secondary side 108 from the high AC input voltage present on the primary side 106. Because the transformer 104 is a step-down transformer, the transformer 104 is generally considered part of the galvanic isolation barrier 154. For example, the galvanic isolation barrier 154 can include a core 125 of the transformer 104 along with an auxiliary winding 114. In one embodiment, the transformer 104 includes the auxiliary winding 114 that is to provide a stepped-down voltage as power to the primary side controller 102 via the AUXIN pin 132.

In some embodiments, the auxiliary winding 114 along with a diode 111 followed by capacitor C3 and C2 to ground stores the stepped-down voltage which is then regulated by a bipolar junction transistor (BJT) structure (and/or other circuitry within an optional regulator) and then coupled with the AUXIN pin 132. This additional circuitry helps to regulate total voltage being coupled to AUXIN pin 132 of the AC-DC converter 100 after startup, as the primary side controller 102 can be supplied through the AUXIN pin 132 instead of via the startup supply voltage (VDD).

In various embodiments, the primary side controller 102 is configured to receive pulse signals, via a pulse transformer (not illustrated), from the secondary side controller 150 across the galvanic isolation barrier 154. The pulse signals can be received, for example, at a PULSEIN pin 151 of the primary side controller 102. The primary side controller 102 can, for example, further include pulse-width modulation (PWM) control circuitry to detect the pulse signals and appropriately turn on or turn off the primary switch 116 based on these pulse signals. For purposes of the present discussion, the PWM control circuitry can include at least a signal receiver 142, which receives edges and the reconstructs the edges into PWM pulses, a PWM generator 144, which generates PWM waveforms with the help of a free running oscillator 145, and a startup controller 146. The primary side controller 102 can further include a gate driver 148 coupled between the startup controller 146 and the gate driver (GD) pin.

In some embodiments, the startup controller 146 transmits a signal generated by the PWM generator 144 to the gate driver 148 to turn on the primary switch 116, and the PWM generator 144 generates pulses corresponding to those detected by the signal receiver 142, as will be explained. The free running oscillator 145 can supply free running pulses to the PWM generator 144, so that the PWM generator 144 can generate a free running PWM signal when the secondary side 108 is not active, e.g., during soft start of the AC-DC converter 100.

In one example, the primary side controller 102, in order to apply a pulse signal to the primary side switch 116, is configured to receive a turn-on pulse from the secondary side controller 150. The PWM generator 144 can apply the turn-on pulse to the gate of the primary switch 116 via the gate driver 148. The turn-on pulse causes the primary drain of the primary switch 116 to go low, e.g., a first voltage level corresponding to a first state or representing the digital value of one. Subsequently, the primary side controller 102 receives a turn-off pulse from the secondary side controller 150. The PWM generator 144 can apply the turn-off pulse to the gate of the primary switch 116 via the gate driver 148. The turn-off pulse causes the primary drain of the primary switch 116 to go high, e.g., a second voltage level corresponding to a second state or representing the digital value of zero.

In some embodiments, the primary side controller 102 further includes an OVP circuit 140 that is integrated within the IC and that regulates the output voltage of the secondary side winding (Ns) during startup, e.g., before the secondary side 108 becomes active and starts sending pulse signals to the primary side controller 102. The OVP circuit 140 can be coupled between the gate driver 148 and the OVP pin 134. An over-voltage protection (OVP) system can be understood to include at least the OVP circuit 140 in addition to a voltage divider, which includes a pair of resistors (R2, R3) coupled between the OVP pin 134 and the auxiliary winding 114 that is to sense a reflected voltage of the voltage bus input ($V_{BUS\_IN}$) on the secondary side 108 via the transformer 104.

More specifically, the voltage divider can include a first resistor (R2) coupled between the auxiliary winding 114 and the OVP pin 134 and a second resistor (R3) coupled between the first resistor and a ground (GND). For example, a positive terminal of the auxiliary winding 114 can be coupled with the first resistor, and a negative terminal of the auxiliary winding 114 can be coupled with the ground. The voltage divider can thus provide, to the OVP pin 134, a reduced voltage that is proportional to the output voltage of the secondary winding (Ns) of the transformer 104. For example, a size of the first resistor can be between 40 and 75 times larger than that of the second resistor in various embodiments.

This reduced voltage can then be compared to a reference OVP voltage supplied by the OVP circuit 140 for purposes of over-voltage detection. In some embodiments, the reference OVP voltage is programmable within the OVP circuit 140 (e.g., as 1.2V, 3.3V, 5V, or some other appropriate programmed values of voltage), and thus can be changed based on manufacturer voltage tolerances and selected resistors of the voltage divider, for example. In the absence of a pulse signal from the secondary side controller 150, the OVP circuit 140 can turn off the gate driver 148 that drives the primary switch 116 in response to the reduced voltage exceeding the reference OVP voltage. For example, the OVP circuit 140 can assert an output (OVP_OUT) that turns off or disables the gate driver 148.

Figure 6A:
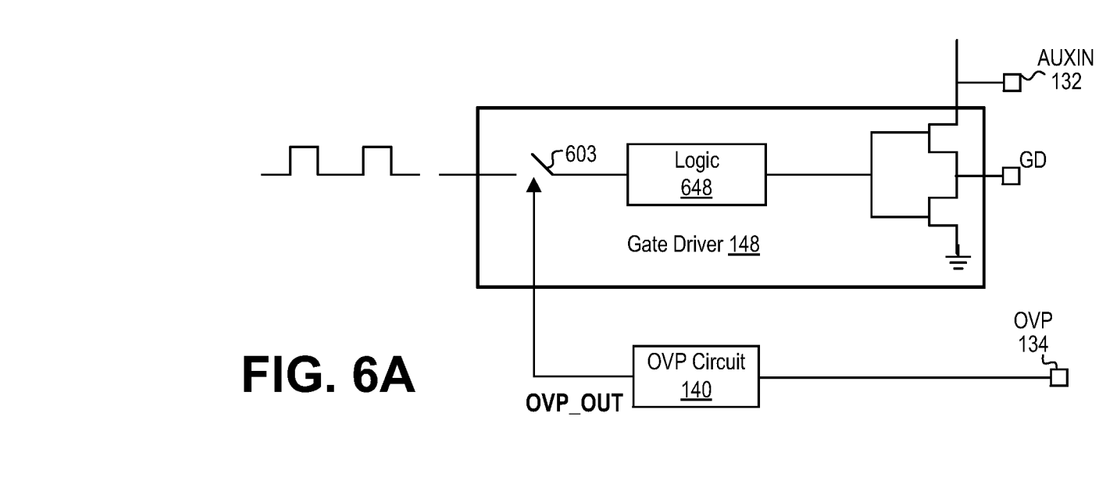
FIGS. 6A-6C are three circuit diagrams illustrating different ways of turning off or disabling a gate driver circuit that drives a primary switch according to various embodiments.
Figure 6B:
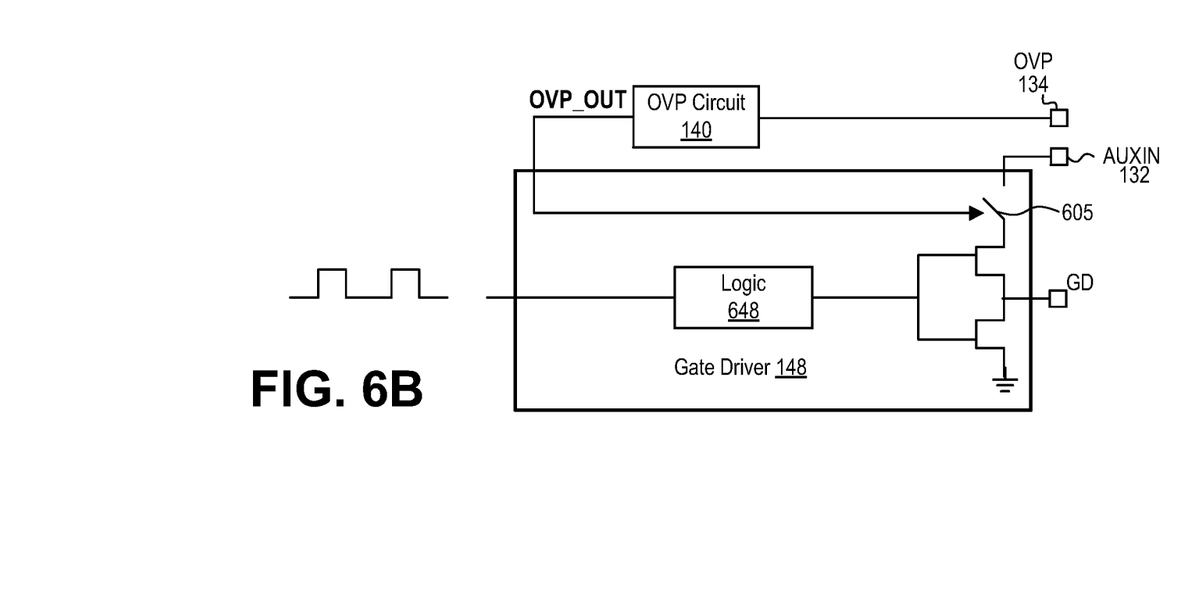
Figure 6C:
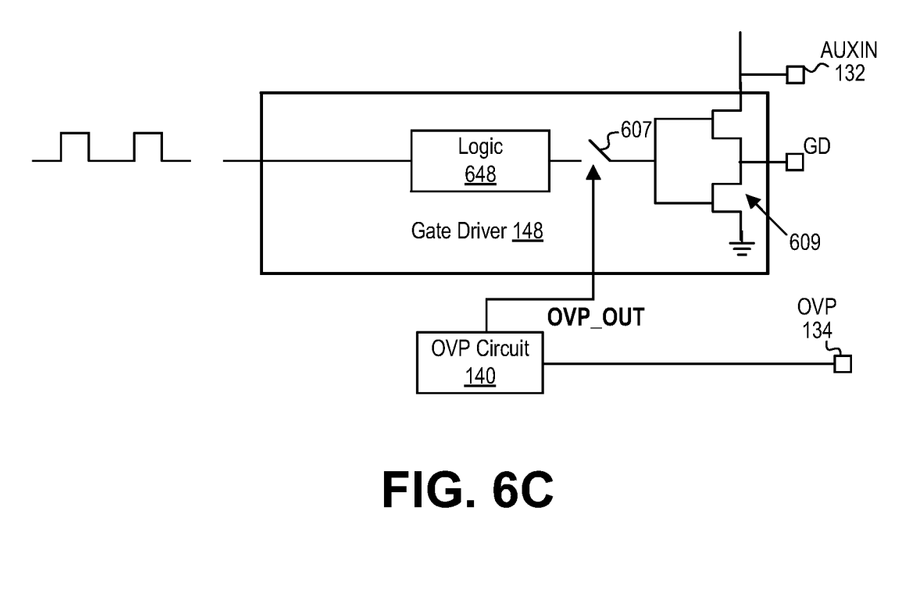

FIGS. 6A-6C are three circuit diagrams illustrating different ways of turning off or disabling the gate driver 148 that drives the primary switch 116 according to various embodiments. In one embodiment, as illustrated in FIG. 6A, the OVP output (OVP_OUT) can open a switch 603 interposed between the startup controller 146 and logic 648 of the gate driver 148, e.g., to disable the gate driver 148. In another embodiment, as illustrated in FIG. 6B, the OVP output can open a switch 605 interposed between the AUXIN pin 132 (e.g., supply voltage) and the gate driver 148, e.g., to turn off the gate driver 148. In still another embodiment, as illustrated in FIG. 6C, the OVP output can open a switch 607 interposed between the logic 648 and output gates 609 of the gate driver 148, e.g., to disable the gate driver 148.

With additional reference to FIG. 1, by way of providing further over-voltage protection, the OVP system discussed herein can further include a capacitor (C4) coupled in parallel with the second resistor (R2) and/or a Schottky diode 115 coupled between the OVP pin 134 (and thus the output of the voltage divider) and the ground. The capacitor C4 can filter the reduced OVP voltage and maintain signal vitality of the reduced OVP voltage at the OVP pin 134.

The functionality of the OVP circuit 140 will be discussed in more detail with reference to FIGS. 2-5. In one embodiment, in response to the reduced voltage falling below the reference OVP voltage, the primary side controller 102 performs an auto-restart after a predetermined waiting period. The auto-restart enables voltage to again build through the transformer 104 as the OVP circuit 140 is allowed to throttle the output voltage of the secondary winding about the reference OVP voltage, thus protecting the secondary side from damage due to over-voltage. Further, an output of the OVP circuit 140 can be cleared in response to an output of the gate driver 148 being asserted, e.g., due to the secondary side controller 150 initiating PWM control, as was discussed previously.

On the secondary side 108, the AC-DC converter 100 includes a filter capacitor 121 coupled between a third terminal of the transformer 104 and an electrical ground or ground terminal, and an output capacitor 120 coupled between the third terminal of the transformer 104 and an electrical ground to provide a DC output voltage to an output interface or the output connector 122. The output connector 122 can further be coupled with the secondary side controller 102 through a number of communication channels 124 to support various charging protocols. Suitable output connectors 122 can include those compatible with and supporting standard and proprietary charging protocols including Universal Serial Bus Power Delivery USB PD2.0 and USB PD3 with Programmable Power Supply (PPS), Qualcomm® Quick Charge, Samsung® AFC, and Apple® charging protocols. For example, the connector can include a Universal Serial Bus type C (USB-C) compatible connector where the AC-DC converter 100 is compliant with the USB protocol to provide a DC output voltage of about 3.3 VDC to about 21.5 VDC at a current of from about 0 to about 5000 milliamps (mA).

In various embodiments, the AC-DC converter 100 further includes, on the secondary side 108, a synchronous rectifier such as a synchronous rectifier (SR) FET 126, coupled between a fourth terminal of the transformer 104 and the ground terminal of the DC output. The SR FET 126 includes a first or drain node coupled with the fourth terminal of the transformer 104 and the secondary side controller 150 to sense a voltage on the drain of the SR FET 126; a second or gate node coupled with the secondary side controller 150 to drive or control the SR FET 126; and a third or source node coupled with the secondary side controller and the ground terminal of the DC output. The gate node of the SR FET 126 can be coupled with an SR-drive pin 123 of the secondary side controller 150.

Optionally, as in the embodiment shown, the secondary side 108 further includes an additional or secondary switch 136, such as an NFET, coupled between the third terminal of the transformer 104 and a positive DC output to enable the secondary side controller 150 to turn off the DC output to protect against over voltage and/or under voltage conditions. The secondary switch 136 includes a drain node coupled with a $V_{BUS\_IN}$ of the secondary side controller 150; a gate node coupled with a voltage bus control pin ($V_{BUS\_CTRL}$) 127 to drive or control the secondary switch 136; and a source node coupled with a voltage bus out pin ($V_{BUS\_OUT}$) 20 and to the positive terminal of the DC output. (Not all pins illustrated.)

In corresponding embodiments, when the primary side power switch (e.g., the primary FET 116) is closed, the primary side 106 of the transformer 104 is connected to the input voltage source. In this embodiment, the primary side 106 of the transformer 104 is coupled with the bridge rectifier 110. As the primary current and magnetic flux in the transformer 104 increases, energy is stored in the magnetic field. The voltage induced in the secondary winding is negative and blocked by the secondary side power switch (e.g., the SR FET 126). When the primary FET 116 is opened, the primary current and magnetic flux drop. The secondary voltage is positive, allowing current to flow from the transformer 104. The energy stored in the transformer 104 is transferred to an output load, such as a USB charging device. The output capacitor 120 can be used to supply energy to the output load when the primary switch 116 is engaged. Thus, the transformer 104, based on control of the primary switch 116, can store energy and transfer the energy to the output of the AC-DC converter 100.

Additionally where, as in the embodiment shown, the AC-DC converter 100 is a flyback converter in which a control signal 156 is provided to the primary side controller 102 from pins on the secondary side controller 150, such as a feedback pin 153 or pulse width modulation (PWM) drive pin 158, the galvanic isolation barrier 154 can further include additional circuits or elements between the secondary side controller 150 and the primary side controller 102 or the primary FET 116, e.g., to pass additional pulse signals to the primary side controller 102. For example, the primary side controller 102 can be configured to receive a control (or pulse) signal as one or more pulses, via the previously mentioned pulse transformer (not illustrated), from the secondary side controller 150 across the galvanic isolation barrier 154.

In some embodiments, the secondary side 108 together with the secondary side controller 150 includes sensing circuitry to generate a sense signal in response to voltage detected at the secondary side of the transformer 104. The sense signal is to be sent to the primary side controller 102 to turn on a primary FET 116 of the primary side 106. More specifically, a drain node 126a of the SR FET 126 is coupled with a single SR sense (SR-SNS) pin 128 of the IC through a voltage divider 160 including circuit elements both internal and external to the IC of the secondary side controller. The voltage that is sensed is passed through SR sense circuitry 170 and PWM circuitry 174 before being sent to the primary side controller 102 via the PWM driving pin 158.

In various embodiments, the voltage divider 160 includes an external resistive element 161, a (variable) internal resistive element 164 and an internal rectifier 168. Although shown schematically as a diode, it will be understood that this need not be the case in every embodiment, and that internal rectifier 168 can be a PN diode (as shown), or alternatively, a synchronous diode or a FET configured or connected to function as a diode. The configuration or placement of the internal rectifier 168, i.e., connected with a cathode to ground, ensures that during negative sensing or zero-crossing operations there is substantially no current flow through the voltage divider 160, thereby allowing the full, undivided negative voltage on the drain node 126a to be coupled with the SR-SNS pin 128. A resistance value of external resistive element 161 is generally fixed by the manufacturer of the AC-DC converter 100 and is selected based on an expected maximum voltage on the drain node 126a based on the maximum AC voltage input, and turn-ratio of the transformer 104 to limit a maximum voltage on the SR_SEN node 128 to enable the secondary side controller 150 to be made with non-high voltage devices, made using standard, low voltage technologies.

Optionally, as in the embodiment shown, the voltage divider 160 further includes a bypass switching element or switch 162 in parallel the internal rectifier 168. The switch 162 is closed during feed-forward (ff) sensing in response to an ff-signal (ff_enable) generated in the secondary side controller 150 upon detection of an increasing or non-zero positive voltage on the drain node 126a, which indicates a feed-forward operation.

The secondary side controller 150 can further include an SR sense circuit 170 coupled with the drain node 126a, e.g., attached to the SR_SEN pin 128. The SR sense circuit 170 can include a zero-crossing detector (ZCD), a negative-sensing (NSN) circuit, a peak-detector (PKD) circuit, and a line-feed-forward (LFF) circuit for sensing a voltage on the drain 126a of the SR 126 to sense or detect a zero-crossing, a negative voltage, a peak (positive) voltage and a feed-forward operation. One or more outputs of the SR sense circuit 170 are coupled with a pulse width modulation (PWM) circuit 174 to provide the signal 156 through the PWM drive pin 158 to the primary side controller 102 to control the primary switch 116. The PWM circuit 174 includes a ramp generator and PWM for generating a signal having a modulated pulse width, and a PWM driver for boosting a voltage or power of the signal to that necessary for driving the primary side controller 102 or the primary FET 116, e.g., via the gate driver 148 of the primary side controller 102.

Figure 2:
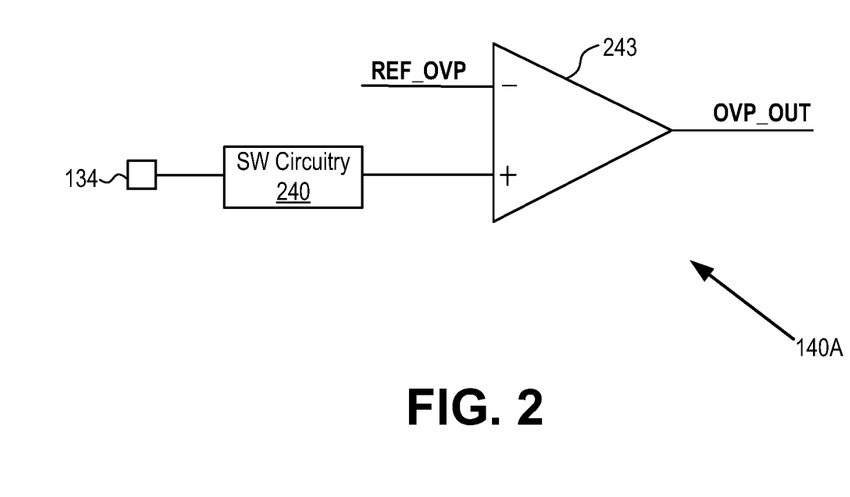
FIG. 2 is a simplified schematic block diagram of an OVP circuit according to an embodiment.

FIG. 2 is a simplified schematic block diagram of an OVP circuit 140A according to an embodiment. In one embodiment, the OVP circuit 140A is OVP circuit 140 of FIG. 1. In some embodiments, the OVP circuit 140A includes a comparator 243 that has, as inputs, a reference OVP voltage (REF_OVP) and the reduced voltage received at the OVP pin 134, and as an output, an OVP output (OVP_OUT). In some embodiments, the OVP circuit 140A includes switch circuitry 240 to selectively receive the reduced voltage during an OVP detect mode of the OVP circuit 140A. During the OVP detect mode, the OVP circuit 140A can assert the OVP output to turn off the gate driver 148 that drives the primary FET 116 in response to the reduced voltage exceeding the reference OVP voltage. In some embodiments, the SW circuitry 240 is not able to assert such an OVP output if there is a pulse signal being received from the secondary side controller 150.

Figure 3:
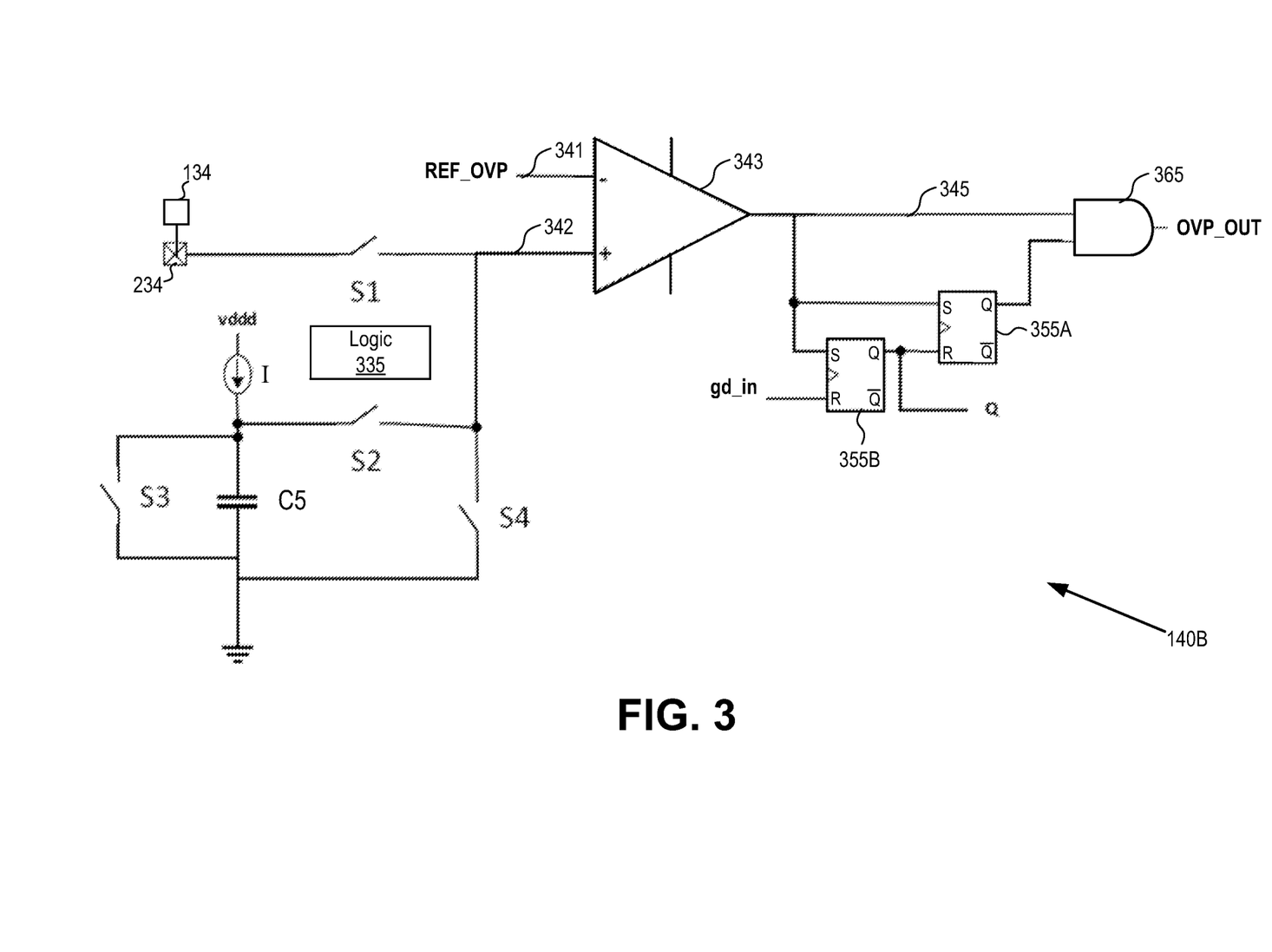
FIG. 3 is a more-detailed schematic block diagram of an OVP circuit according to another embodiment.

FIG. 3 is a more-detailed schematic block diagram of an OVP circuit 140B according to another embodiment. In some embodiment, the OVP circuit 140B is the OVP circuit 140 of FIG. 1. In some embodiments, the OVP circuit 140B includes a comparator 343 having an output line 345 coupled with a supply voltage of the gate driver 148, a first input line 341 coupled with a reference OVP voltage (REF_OVP), and a second input line 342 coupled with the OVP pin 134. The OVP circuit 140B can further include an OVP pad 234 on the IC that is connected to the OVP pin 134, although the voltage at the OVP pad 234 and the OVP pin 134 should be identical. Further, in the absence of a pulse signal from the secondary side controller 150 and in response to the reduced voltage (on the second input line 342) exceeding the reference OVP voltage (on the first input line 341), the comparator 343 asserts an output signal (OVP_OUT), e.g., on the output line 345, to turn off the supply voltage of the gate driver 148. While "to assert" is generally referred to as causing a voltage to a high digital value and "to deassert" is generally referred to as causing the voltage to a low digital value, the opposite could be true using reverse logic in alternative embodiments.

With additional specificity, the OVP circuit 140B can further include logic 335 for controlling various switches or signals, as will be explained, to in part control a mode of the OVP circuit 140B. In various embodiments, the OVP circuit 140B includes a first switch (S1) on the second input line, which can be closed to cause the comparator 343 to enter an OVP detect mode. Further, the OVP circuit 140B can include a current source (I) coupled in series with a capacitor (C5) and a second switch (S2) having a first end coupled between the current source and an anode terminal of the capacitor, C5, and a second end coupled with the second input line 342. A third switch (S3) can be coupled between the anode terminal and a cathode terminal of the capacitor and a fourth switch (S4) can be coupled between the cathode terminal of the capacitor and the second end of the first switch, S1. Thus, while not illustrated to simplify the illustration of FIG. 3, the logic 335 can control, at least in part, these various switches. The logic 335 can also, in response to the reduced voltage falling below the reference OVP voltage, cause the integrated circuit (IC) that is the primary side controller 102 to perform an auto-restart.

The OVP circuit 140B can further include an AND gate 365 having a first input coupled with the output line 345 of the comparator 343 and an output coupled with the gate voltage of the gate driver 148. The output of the AND gate 365, when present, can be considered to be the OVP output (OVP_OUT) of the entire OVP circuit 140B that is to control whether or not the gate driver 148 is powered on or off. In these embodiments, the OVP circuit 140B further includes a first set-reset (S-R) flip-flop 355A having an output coupled with a second input of the AND gate 365, a set input coupled with the output line 345, and a reset input to receive a Q logic signal. In these embodiments, the OVP circuit 140B further includes a second S-R flip-flop 355B having an output coupled with the rest input of the first S-R flip-flop 355A, a set input coupled with the output line 345, and a reset input coupled with an output (gd_in) of the gate driver 148. In other embodiments, different gates or logic components can be used in lieu of S-R flip-flops, for example.

Table 1 includes signal values that the logic can assert (e.g., to a one ("1") value) or deassert (e.g., to a zero ("0") value) to the switches, the Q logic signal, and that may be received from the output from the gate driver 148 (gd_in) in order to control a particular mode of the OVP circuit 140B.

TABLE 1

| Q | gd_in | S1 | S2 | S3 | S4 | Mode |
|---|---|---|---|---|---|---|
| 0 | 1 | 0 | 0 | 1 | 1 | Reset |
| 0 | 0 | 0 | 1 | 0 | 0 | Blanking |
| 1 | x | 1 | 0 | 1 | 0 | OVP Detect |

In one embodiment, in response to an output of the gate driver 148 being deasserted (e.g., to a low digital voltage), the logic 335 closes the second switch S2 while the third switch S3 and the fourth switch S4 are each left opened during a blanking period in which the current source I charges the capacitor C5 to the reference OVP voltage. The current amount supplied by the current source I and the size of the capacitor C5 can be designed so that the blanking period lasts between 1 and 5 μs, for example. The blanking mode enables a charge of the reference OVP voltage to build up on the capacitor C5.

In some embodiments, when the voltage on the capacitor C5 reaches the reference OVP voltage, the comparator 343 is triggered to assert an output (e.g., to a high digital voltage) and the OVP circuit 140B enters the OVP detect mode. In these embodiments, upon entering the OVP detect mode, the logic 335 opens the second switch S2 and the fourth switch S4 and closes the third switch S3. Further the logic 335 can assert the Q logic signal, resetting the first S-R flip-flop 355A, which causes an output of the AND gate 365 to be deasserted as the comparator 343 enters an OVP detect mode.

The first switch S1 remains closed in order to now detect whether the reduced voltage at the OVP pin 134 (or OVP pad 234) exceeds the reference OVP voltage, REF_OVP. If the reduced voltage from the OVP pin 134 exceeds the reference OVP voltage, the comparator 343 detects an OVP fault condition, causing the output to be asserted, e.g., at the output line 345. As long as the output of the gate driver 148, or gd_in, is not also asserted, the output of the OVP circuit 140B (OVP_OUT) is also asserted, thus turning off the gate driver 148.

Further, in some embodiments, in response to an output of the gate driver 148 being asserted, the logic 335 closes the first switch S1, third switch S3, and the fourth switch S4 to enter a reset mode in which the output signal of the OVP circuit 140B is deasserted. In this embodiment, the first S-R flip-flop and the second S-R flip-flop also cause an output of the AND gate 365 to be deasserted in the reset mode of the comparator. Thus, the output of the gate driver 148 would have to be deasserted again in order to again start up the blanking mode.

Figure 4:
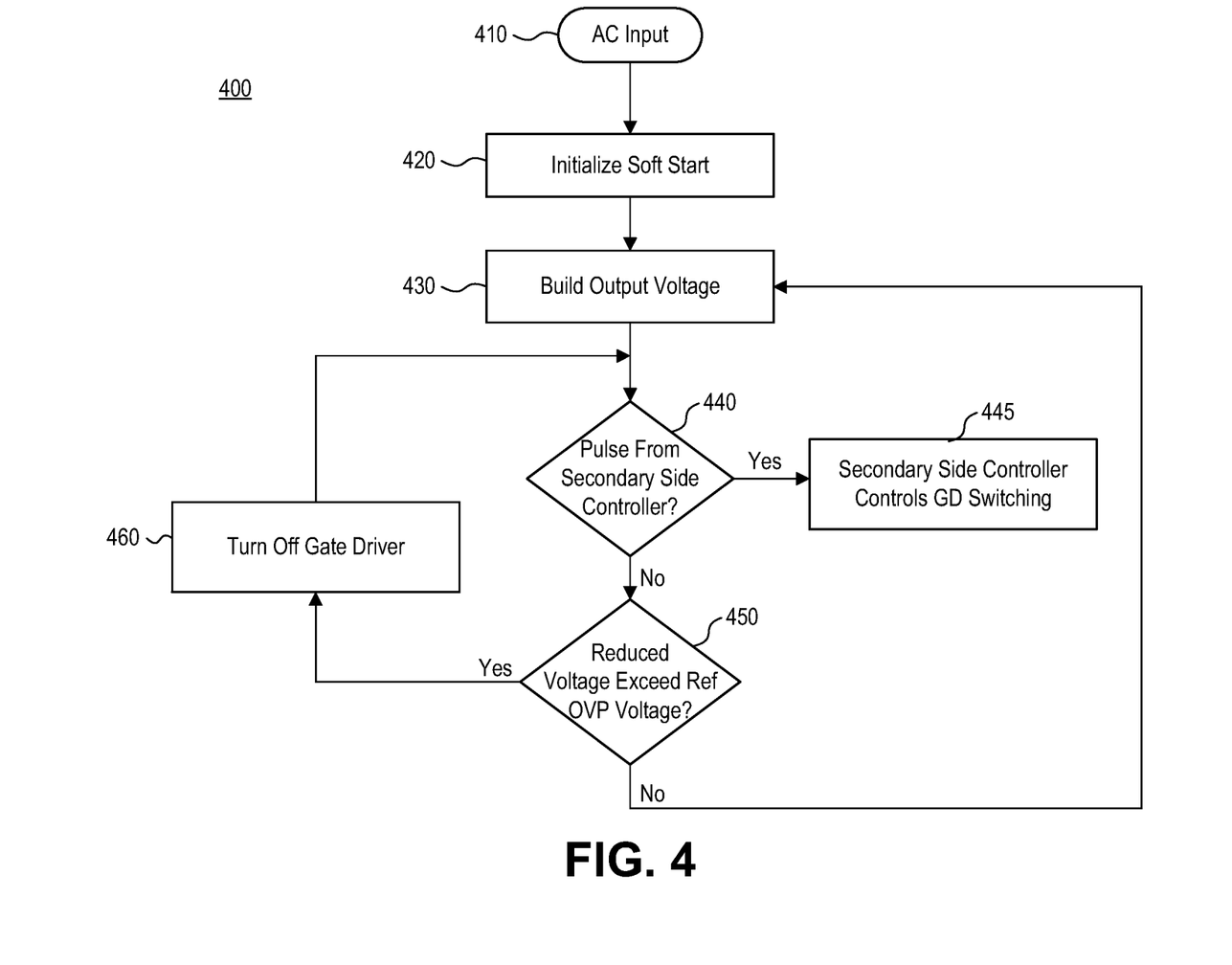
FIG. 4 is a flow diagram of a method for providing, by a primary side controller, over-voltage protection to a secondary side while initiating a secondary side controller according to various embodiments.

FIG. 4 is a flow diagram of a method 400 for providing, by a primary side controller, over-voltage protection to a secondary side while initiating a secondary side controller according to various embodiments. The method 400 can be performed at least in part by processing logic that includes hardware (e.g., circuitry, dedicated logic, programmable logic, microcode, etc.), firmware, or a combination thereof. In one example embodiment, the method 400 is performed by processing logic included in the primary side controller 150 of the AC-DC converter 100.

At operation 410, the AC-DC converter 100 receives an AC input that triggers initialization of the AC-DC converter 100. For example, the AC input can be received at the input terminals of the bridge rectifier 110.

At operation 420, the processing logic as well as analog circuitry of the primary side 106 can initialize a soft start of the AC-DC converter 100 that includes initial control of the primary FET 116 during startup and fault conditions. This soft start can include an incremental increase in duty cycle of PWM waveforms by the PWM generator 144 during initial start-up to decrease stress on the primary switch 116 and the components of the power stage, namely, an input fuse, the bridge rectifier 110, the transformer 104, the Rsense resistor and the primary switch 116. The soft start can also be initiated by a fault. The soft start can further include, for example, performing an auto-restart of the primary side controller 102, initial powering of the primary side controller 102 via the VDD pin 130, and detecting and reacting to faults associated with start-up of the primary side 106 before the secondary side controller 150 takes over PWM-driven control of the primary side controller 102.

For example, at operation 430, the processing logic allows to build the output voltage of the secondary side 108.

At operation 440, the processing logic determines whether a pulse signal has been received from the secondary side controller 150.

If the answer to operation 445 is yes, the processing logic of the secondary side controller 150 controls switching. It usually takes some time before reaching this point, however, causing the processing logic to first continue on to operation 450. At operation 450, the processing logic determines whether the reduced voltage received from the voltage dividers (R2, R3) exceeds the reference OVP voltage, e.g., the OVP threshold voltage.

If the answer to operation 450 is no, the processing logic can loop back to operation 430, where the processing logic allows the output voltage to continue to build up, e.g., increase.

If the answer to operation 450 is yes, at operation 460, the processing logic turns off the gate driver 148, such as through the operation of the detect mode of OVP circuit discussed with reference to FIGS. 1-3. In one embodiment, the processing logic sends an OVP output signal that disables the gate drive driver 148.

Figure 5:
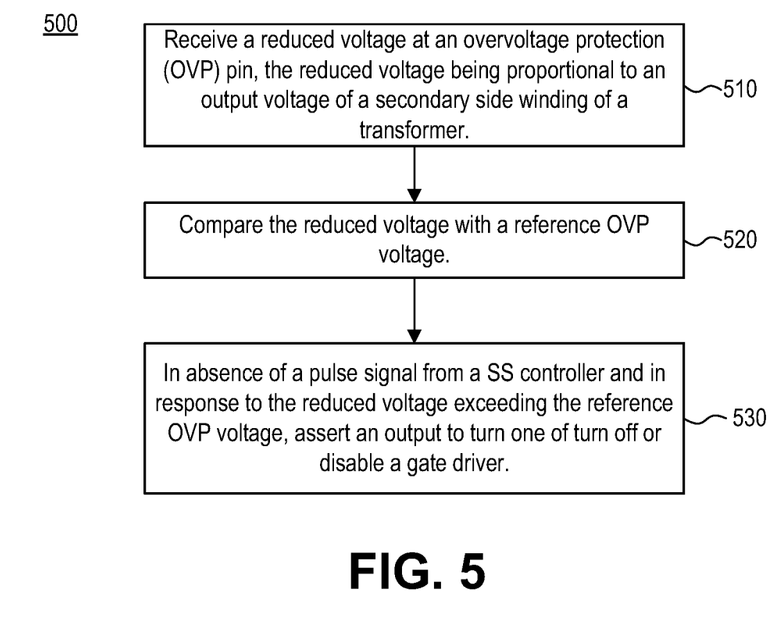
FIG. 5 is a flow diagram of a method for providing, by a primary side controller, over-voltage protection to a secondary side while initiating a secondary side controller according to an embodiment.

FIG. 5 is a flow diagram of a method 500 for providing, by a primary side controller, over-voltage protection to a secondary side while initiating a secondary side controller according to an embodiment. The method 500 can be performed at least in part by processing logic that includes hardware (e.g., circuitry, dedicated logic, programmable logic, microcode, etc.), firmware, or a combination thereof. In one example embodiment, the method 500 is performed by processing logic included in the primary side controller 150 of the AC-DC converter 100.

At operation 510, the processing logic receives a reduced voltage at an over-voltage protection (OVP) pin that is coupled with an auxiliary winding of a transformer of the AC-DC converter, the reduced voltage being proportional to an output voltage of a secondary side controller of the transformer.

At operation 520, the processing logic compares the reduced voltage with a reference OVP voltage. For example, the processing logic can include the comparator 243 or 343 to perform the comparison.

At operation 530, in the absence of a pulse signal from a secondary side controller and in response to the reduced voltage exceeding the reference OVP voltage, the processing logic asserts an output to one of turn off or disable a gate driver. The processing logic can be that of the OVP circuit 140A or 140B (FIGS. 2-3), for example. An output of the gate driver can be coupled with the primary switch that is coupled between a primary winding of the transformer and a ground.

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "communicating," "modifying," "measuring," "determining," "sending," "comparing," "maintaining," "switching," "controlling," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A system comprising:
a transformer comprising a primary winding and an auxiliary winding at a primary side of an alternating current to direct current (AC-DC) converter, the auxiliary winding to reflect an output voltage of a secondary winding of the transformer;
a primary side controller comprising an over-voltage protection (OVP) pin and an OVP circuit;
a voltage divider comprising a first resistor coupled between the auxiliary winding and the OVP pin and a second resistor coupled between the first resistor and a ground, the voltage divider to provide, to the OVP pin, a reduced voltage that is proportional to the output voltage; and
wherein, in the absence of a pulse signal from a secondary side controller, the OVP circuit is to turn off a gate driver that drives a primary switch in response to the reduced voltage exceeding a reference OVP voltage, the primary switch being coupled between the primary winding of the transformer and the ground.

2. The system of claim 1, wherein a size of the first resistor is between 40 and 75 times larger than that of the second resistor and according to a programmed value for the reference OVP voltage, a positive terminal of the auxiliary winding is coupled with the first resistor, and a negative terminal of the auxiliary winding is coupled with the ground.

3. The system of claim 1, further comprising a capacitor coupled in parallel with the second resistor to filter the reduced OVP voltage and maintain signal vitality of the reduced OVP voltage.

4. The system of claim 1, further comprising a Schottky diode coupled between the OVP pin and the ground.

5. The system of claim 1, wherein, in response to the reduced voltage falling below the reference OVP voltage, the primary side controller is to perform an auto-restart after a predetermined waiting period.

6. The system of claim 1, wherein the primary side controller comprises the gate driver, an output of the gate driver is coupled with a gate of the primary switch, and wherein the OVP circuit comprises a comparator to compare the reference OVP voltage with the reduced voltage and to turn off a supply voltage of the gate driver in response to the reduced voltage exceeding the reference OVP voltage.

7. The system of claim 6, wherein an output of the OVP circuit is cleared in response to an output of the gate driver being asserted.

8. An integrated circuit for a primary side of an alternating current to direct current (AC-DC) converter, the integrated circuit comprising:
an over-voltage protection (OVP) pin that is coupled with an auxiliary winding of a transformer of the AC-DC converter, the OVP pin to receive a reduced voltage that is proportional to an output voltage of a secondary winding of the transformer;
a gate driver to drive a primary switch that is coupled between a primary winding of the transformer and a ground; and
a comparator comprising:
an output line coupled with a supply voltage of the gate driver;
a first input line coupled with a reference OVP voltage; and
a second input line coupled with the OVP pin; and
wherein, in the absence of a pulse signal from a secondary side controller and in response to the reduced voltage exceeding the reference OVP voltage, the comparator is to assert an output signal to one of turn off or disable the gate driver.

9. The integrated circuit of claim 8, further comprising a switch on the first input line, wherein the switch is closed to cause the comparator to enter an OVP detect mode.

10. The integrated circuit of claim 8, further comprising:
a current source coupled in series with a capacitor;
a first switch having a first end coupled between the current source and an anode terminal of the capacitor and a second end coupled with the second input line;
a second switch coupled between the anode terminal and a cathode terminal of the capacitor; and
a third switch coupled between the cathode terminal of the capacitor and the second end of the first switch.

11. The integrated circuit of claim 10, further comprising logic to, in response to an output of the gate driver being deasserted, close the first switch while the second switch and the third switch are each left opened during a blanking period in which the current source charges the capacitor to the reference OVP voltage.

12. The integrated circuit of claim 10, further comprising logic to, in response to an output of the gate driver being asserted, close the second switch and the third switch to enter a reset mode in which the output signal is deasserted.

13. The integrated circuit of claim 10, further comprising logic to, in response to entering an OVP detect mode, open the first switch and the third switch and close the second switch.

14. The integrated circuit of claim 8, further comprising:
an AND gate having a first input coupled with the output line of the comparator and an output coupled with the gate voltage of the gate driver;
a first set-reset (S-R) flip-flop having an output coupled with a second input of the AND gate, a set input coupled with the output line, and a reset input to receive a Q logic signal; and
a second S-R flip-flop having an output coupled with the rest input of the first S-R flip-flip, a set input coupled with the output line, and a reset input coupled with an output of the gate driver.

15. The integrated circuit of claim 14, wherein, in response to the output of the gate driver being asserted, the first S-R flip-flop and the second S-R flip-flop are to cause an output of the AND gate to be deasserted in a reset mode of the comparator.

16. The integrated circuit of claim 14, wherein, in response to the Q logic signal being asserted, the first S-R flip-flop is to cause an output of the AND gate to be deasserted as the comparator enters an OVP detect mode.

17. The integrated circuit of claim 8, further comprising logic to, in response to the reduced voltage falling below the reference OVP voltage, cause the integrated circuit to perform an auto-restart after a predetermined waiting period.

18. A method of operating a primary side controller of an alternating current to direct current (AC-DC) converter, the method comprising:
receiving a reduced voltage at an over-voltage protection (OVP) pin that is coupled with an auxiliary winding of a transformer of the AC-DC converter, the reduced voltage being proportional to an output voltage of a secondary side controller of the transformer;
comparing, using a comparator, the reduced voltage with a reference OVP voltage; and in the absence of a pulse signal from a secondary side controller and in response to the reduced voltage exceeding the reference OVP voltage, asserting, by the comparator, an output to turn off a supply voltage that powers a gate driver, wherein an output of the gate driver is coupled with a primary switch that is coupled between a primary winding of the transformer and a ground.

19. The method of claim 18, further comprising, in response to the reduced voltage falling below the reference OVP voltage, causing the primary side controller to perform an auto-restart after a predetermined waiting period.

20. The method of claim 18, further comprising, in response to an output of the gate driver being asserted, deasserting an output of the comparator during a reset mode of the comparator.

* * * * *